3,476,648
PROCESS FOR PYRROLNITRIN PRODUCTION
Marvin Gorman, Michael E. Haney, Jr., David H. Lively, and James D. Davenport, Indianapolis, Ind., assignors to Eli Lilly and Company, Indianapolis, Ind., a corporation of Indiana
No Drawing. Filed Mar. 14, 1966, Ser. No. 533,787
Int. Cl. C12b *1/00;* C12k *3/00*
U.S. Cl. 195—96                    5 Claims

ABSTRACT OF THE DISCLOSURE

In production of pyrrolnitrin by fermentation, improved yields are obtained by adding dl- or d-tryptophane to the fermentation medium.

---

This invention relates to an improved process for the production of pyrrolnitrin. More particularly, this invention relates to a process for obtaining improved yields of pyrrolnitrin by adding the amino acid tryptophane to the fermentation medium in which the antibiotic is produced.

Pyrrolnitrin is an antibacterial and antifungal antibiotic which has been described in the Journal of Antibiotics, Series A, vol. 18, p. 211 (1965). Its spectrum of activity, especially with respect to its antifungal activity, is of sufficient interest that the antibiotic holds promise of becoming commercially important. Any process, therefore, which increases the amount of this antibiotic which can be obtained by fermentation constitutes a valuable contribution to the art.

It is, therefore, an object of this invention to provide a process whereby increased yields of pyrrolnitrin can be obtained during fermentation. A further object of the invention is the provision of such a process wherein the said enhanced yields can be obtained without departing radically from the fermentation procedure heretofore employed. Still another object of the invention is to provide increased yields of pyrrolnitrin by the addition to the fermentation medium of a readily available chemical substance to enhance pyrrolnitrin production. Still a further object of the invention is the provision of a method for obtaining modified pyrrolnitrin derivatives by employing variously substituted tryptophane derivatives in the fermentation medium.

In accordance with these and other objects of the invention, it has now been discovered that the addition of the amino acid tryptophane, and particularly the d-isomer thereof, to the fermentation medium unexpectedly increases the yields of the antibiotic to a surprising degree. The precise mechanism whereby the amino acid is effective in improving antibiotic yields is not presently known. It has been found, however, by means of experiments employing labeled tryptophane containing carbon 14, that tryptophane is apparently a direct precursor of pyrrolnitrin and is converted thereto in some undetermined manner.

The concentration of tryptophane employed in the fermentation medium to increase pyrrolnitrin yields can vary from about 100 to about 2000 mcg./ml. At levels up to about 1000 mcg./ml., increased levels of the amino acid are generally reflected in progressively increasing yields of pyrrolnitrin. At concentrations greater than about 1000 mcg./ml., however, the amount of antibiotic obtained is usually not increased further and, in fact, at very high levels the amount of pyrrolnitrin produced is less than that produced when optimal concentrations are employed. Nevertheless, even at these high levels the amount of pyrrolnitrin produced is greater than that produced when no additive is employed. Optimal production of the antibiotic appears to occur when concentrations of the dl-amino acid between about 500 and 1000 mcg./ml. are employed and such concentrations are, therefore, preferred in the practice of the invention.

The time at which the additive is incorporated into the fermentation medium can be varied within rather wide limits. Thus, in general, the yields of pyrrolnitrin obtained when the amino acid is added at the beginning of the fermentation are approximately equivalent to the yields resulting when the addition is made up to about 72 hours after the initiation of fermentation. When the amino acid is added as late as 96 hours after the beginning of the fermentation, the yields of pyrrolnitrin are still higher than those obtained when no additive is employed, but are generally lower than those attainable when the tryptophane is added within the first 72 hours of the fermentation.

In the practice of the invention tryptophane can be advantageously employed either as the dl-mixture or as the pure d-isomer. In the latter case, quantities of d-tryptophane corresponding to about one-half of those used when the dl-mixture is employed produce approximately equivalent results. Thus, whereas optimal results with dl-tryptophane are observed when the amino acid is added to levels between about 500 and 1000 mcg./ml. the optimal level for the pure d-isomer is between about 250 and 500 mcg./ml.

The observed enhancement of pyrrolnitrin yield occurs in a wide variety of fermentation media. In general, those media giving higher yields of pyrrolnitrin without additive give correspondingly greater yields when the amino acid is added. This generalization, of course, does not apply in the case of fermentation media which initially contain high levels of tryptophane. With this limitation in mind, however, it can be stated that addition of tryptophane to the usual type of fermentation medium will produce as much as twice the yield of the antibiotic otherwise obtainable.

The addition of the amino acid appears to be equally effective in increasing pyrrolnitrin production whether the fermentation is carried out in shake flasks or in stirred equipment. Moreover, the overall nature of the fermentation products produced during the fermentation does not appear to be greatly influenced by the addition of tryptophane. This is evidenced by the fact that the thin layer chromatograms or bioautographs of the fermentation broths obtained from the fermentation media to which the amino acid has been added are substantially identical to those seen when no additional tryptophane has been added.

The practice of the present invention requires virtually no departure from the usual fermentation process for the production of pyrrolnitrin. Thus, for example, the media employed in all steps of the fermentation process can be identical to those formerly employed except for the addition of amino acid to the final production media. Suspensions of the pyrrolnitrin producing organisms Pesudomonas spp. ATCC 15925 or ATCC 15926 are produced from agar slants as is customary in the art. The suspensions are then employed to produce an intermediate vegetative culture and the vegetative culture so obtained is used to inoculate the fermentation medium used for the production of the antibiotic. The normal isolation procedures employed when no additive is present can be utilized to recover the pyrrolnitrin.

For the purpose of determining the effect of tryptophane upon pyrrolnitrin production, it is usually unnecessary to isolate the antibiotic in pure form. The course of fermentation and the effect of the additive upon pyrrolnitrin yields can readily be determined upon examination of the fermentation mixture. Customarily, two volumes of methanol are added to one volume of freshly harvested fermentation mixture and the amount of pyrrolnitrin present is determined by a standard agar diffusion paper disk method using a Neurospora species as the test organism. The results so obtained show excellent correlation with those obtained by actual separation of the antibiotic by chromatography.

It will be apparent to those skilled in the art that the present invention not only makes possible improved yields of pyrrolnitrin but also provides a method for obtaining modified forms of this antibiotic. Thus, for example, by employing variously substituted tryptophanes as additives in the fermentation medium, modified pyrrolnitrins can be recovered. The use of 5-methyltryptophane in the fermentation medium, for example, results in the production of a substance which closely resembles pyrrolnitrin but is, nevertheless, not identical thereto.

The practice of the invention is further illustrated in the examples which follow.

EXAMPLE 1

A culture of Pseudomonas spp. ATCC 15926 is produced by growing the organism on an agar slant having the following composition:

Agar slant medium

|   | G. |
|---|---|
| Trypticas soy broth | 30 |
| Agar | 15 |

Deionized water, added to make a final volume of 1 liter.

The medium is sterilized at 121° C. for 20 minutes in an autoclave. The pH of the medium after sterilization is between about pH 7 and about pH 7.2 The slant is inoculated with cells of Pseudomonas spp. ATCC 15926 and is incubated at about 30° C. for about 48 hours. A loop of the resulting culture is used to inoculate 60 ml. of a vegetative medium contained in a 250-ml. Erlenmeyer flask. The vegetative medium has the following composition:

Vegetative medium

|   | G. |
|---|---|
| Beef extract | 1.5 |
| Yeast extract | 6 |
| Peptone | 6 |
| Casitone[1] | 4 |
| Cerelose | 10 |

Deionized water, added to make a final volume of 1 liter.

[1] Pancreatic digest of casein, sold by Difco Laboratories, Detroit, Mich.

The pH of the vegetative medium after sterilization at 121° C. for 20 minutes is between about pH 6.8 and about pH 7. The inoculated medium is incubated at about 30° C. on a rotary shaker having an agitation rate of 250 r.p.m. and a 2-inch throw for about 6 hours, or until the light transmission of the culture is about 50 percent at a wave length of 525 mµ. The vegetative culture is used as an inoculum for a production medium having the following composition:

Corn steep-molasses-malt medium

| | |
|---|---|
| Sucrose | g__ 25 |
| Molasses (Brer Rabbit) | ml__ 25 |
| Corn steep (50% solids) | ml__ 5 |
| Malt extract | g__ 10 |
| Potassium hydrogen phosphate | g__ 2 |
| NZ Case peptone[1] | g__ 10 |

Tap water, added to make a final volume of 1 liter.

[1] Pancreatic digest of casein for microbiological use, sold by Sheffield Chemicals, Norwich, N.Y.

The foregoing medium is sterilized at 121° C. for 25 minutes and has a final pH after sterilization of about pH 6.2 to about pH 6.4 A number of flasks containing the medium are each inoculated with 0.1 percent (volume/volume) of the vegetative culture obtained as described above and are incubated at about 30° C. on a rotary shaker having a 2-inch throw operating at 250 r.p.m. Various amounts of dl-tryptophane are added to some of the flasks at the time of incubation. The same levels of the amino acid are added to other flasks 24 hours after inoculation. One flask is maintained without the addition of tryptophane to serve as a control. Samples of the culture broth are withdrawn from each of the flasks 120 hours and 144 hours after the fermentation has been initiated. The culture broth samples are diluted with two volumes of methanol and filtered to remove solids. The antibiotic, pyrrolnitrin, is found in the filtered fermentation broths. The amount of antibiotic present is determined by an agar diffusion paper disk assay using a species of Neurospora as the test organism. The results are shown in Table I.

TABLE I

| | dl-Tryptophane added, mcg./ml. of medium | Antibiotic Activity after Indicated Incubation Time, mcg./ml. | |
|---|---|---|---|
| | | 120 hrs. | 144 hrs. |
| Time of Addition, hr.: | | | |
| 0 | 250 | 59 | 59 |
| | 500 | 53 | 52 |
| | 1,000 | 43 | 45 |
| 24 | 250 | 62 | 62 |
| | 500 | 70 | 71 |
| | 1,000 | 59 | 59 |
| Control | 0 | 43 | 44 |

EXAMPLE 2

The effect of adding dl-tryptophane at various times after the beginning of the fermentation is determined by a procedure analogous to that employed in Example 1. The results are shown in Table II.

TABLE II

| | dl-Tryptophane added, mcg./ml. of medium | Antibiotic Activity after Indicated Incubation Time, mcg./ml. | |
|---|---|---|---|
| | | 120 hrs. | 144 hrs. |
| Time of Addition, hr.: | | | |
| 0 | 500 | 80 | 83 |
| | 1,000 | 64 | 96 |
| | 2,000 | 63 | 70 |
| 24 | 500 | 81 | 94 |
| | 1,000 | 80 | 95 |
| | 2,000 | 75 | 85 |
| 48 | 500 | 85 | 97 |
| | 1,000 | 80 | 93 |
| | 2,000 | 73 | 71 |
| 72 | 500 | 90 | 95 |
| | 1,000 | 80 | 78 |
| | 2,000 | 61 | 66 |
| 96 | 500 | 61 | 73 |
| | 1,000 | 66 | 71 |
| | 2,000 | 60 | 68 |
| Control | 0 | 44 | 50 |

EXAMPLE 3

An indication of the optimum level is determined by a procedure analogous to that described in Example 1. The results are shown in Table III.

TABLE III

| Time of Addition, hr.: | dl-Tryptophane added, mcg./ml. of medium | Antibiotic Activity after Indicated Incubation Time, mcg./ml. | |
|---|---|---|---|
| | | 120 hrs. | 144 hrs. |
| 0 | 100 | 40 | 43 |
| | 250 | 58 | 59 |
| | 500 | 73 | 73 |
| | 1,000 | 73 | 70 |
| 24 | 100 | 44 | 44 |
| | 250 | 54 | 59 |
| | 500 | 65 | 68 |
| | 1,000 | 77 | 73 |
| 48 | 100 | 42 | 41 |
| | 250 | 62 | 64 |
| | 500 | 74 | 72 |
| | 1,000 | 82 | 78 |
| Control | 0 | 51 | 58 |

We claim:

1. In the process for the production of pyrrolnitrin by the fermentation of the pyrrolnitrin producing organism Pseudomonas spp. ATCC 15925 or ATCC 15926 in a nutrient medium, the improvement which comprises adding a dl- or d-tryptophane to the fermentation medium in a concentration between about 100 and 2000 mcg. per milliliter of said medium.

2. The process of claim 1 wherein the tryptophane is added in an amount between about 500 and 1000 mcg./ml. of said medium.

3. The process of claim 1 wherein the tryptophane employed is dl-tryptophane.

4. The process of claim 1 wherein the tryptophane employed is d-tryptophane.

5. The process of claim 1 wherein the tryptophane is added within about 72 hours from the initiation of the fermentation.

References Cited

Journal of Antibiotics, Series A, vol. 18, p. 211 (1965).

LIONEL M. SHAPIRO, Primary Examiner

U.S. Cl. X.R.

195—114